Oct. 31, 1950     A. GILLESPIE     2,528,303
NASAL AIR FILTER
Filed March 24, 1947
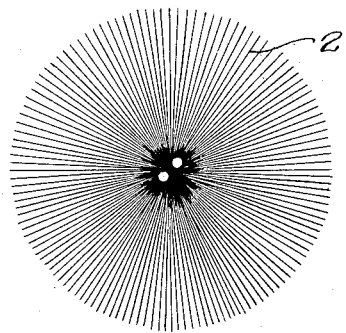
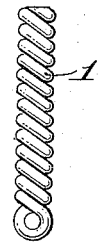
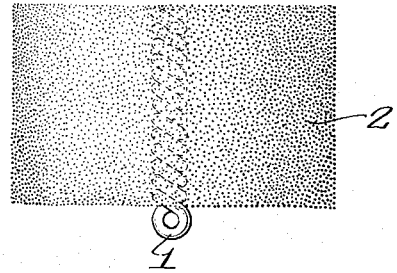

Patented Oct. 31, 1950

2,528,303

UNITED STATES PATENT OFFICE 2,528,303

NASAL AIR FILTER

Alexander Gillespie, Belleville, Ill.

Application March 24, 1947, Serial No. 736,884

1 Claim. (Cl. 128—148)

My invention relates to nasal air filters, for filtering dust and disease germs from the air drawn into the lungs through the nose.

The chief object of the invention is to provide in a small and convenient form, a filter adapted for insertion in the nostrils of a person, the said filter including a central stem and a loosely agglomerated tuft of soft filaments, hairs or fibers supported upon the stem and extended laterally therefrom, and adapted when positioned within a nostril, to catch and hold disease germs and particles of dust that may be floating in the air, and thus filter the air as drawn into the lungs.

Another object of the invention is to provide a nasal air filter of the kind referred to, the same comprising a stem formed of a pair of suitably fine and slender wires, of suitable length, and twisted spirally together upon themselves and upon a plurality of soft filaments, hairs or fibers of suitable length, as distributed from end to end of the twisted stem, the hairs being thus locked radially in place upon the stem for forming a filter tuft adapted for insertion within a nostril for the purpose described.

With the stated objects in view, together with such additional objects as may appear from the specification, attention is directed to the accompanying drawing as embodying a preferred form of the invention, and wherein Figure 1 is a side elevational view of the twisted wire stem of the filter, this view being on an enlarged scale as compared with the actual size of the stem.

Figure 2 is a similarly enlarged side elevational view of the complete nasal air filter.

Figure 3 is a similarly enlarged top plan view of the complete filter.

The nasal air filter comprising the subject matter of this invention includes a wire stem 1, as shown on an enlarged scale in Figure 1, this stem being made of a single length of suitably fine wire bent upon itself to form the lower bight or looped end 1a of the stem. The two resulting lengths 1b, 1c, of the wire are extended upward and are twisted spirally together upon themselves, and in this process of twisting of the wires a plurality of loosely agglomerated and suitably soft filaments, hairs or fibers 2, of proper and uniform lengths, are interlaced along between the wires, from the bight 1a to the outer free ends thereof, so that when the work is completed, these hairs or fibers will project laterally or radially out from the central stem 1, in a uniform and cylindrical arrangement, thus providing the finished filter as indicated at 3. The looped bight portion 1a serves as a handle.

As thus formed, the filaments, hairs or fibers 2 of the filter assume a radially open relation to each other, especially at their outer ends, so as to afford sufficient clearance for the air as drawn through the filter. However, as these clearances are not in alignment from end to end of the filter, the streams of air as drawn through the filter are deflected in all directions and so that they impinge repeatedly upon and against numerous interfering filaments, hairs or fibers, which operate to catch and retain any particles of dust or any disease germs which may float in the air, as same is drawn through the filter.

Generally speaking, the dimensions of the filter would be about one-half inch in length and five-eighths of an inch in diameter, but these dimensions may, of course, be varied as desired.

In use, a pair of the filters are simply inserted into the nostrils when same are desired, for protection against dust and disease germs, the air to the lungs being drawn through the filter for the purpose of cleansing same before it enters the lungs. The efficacy of the filter may, of course, be increased by saturating it with any suitable antiseptic or germicide.

From the foregoing description and explanation, the construction and use of the filter will be fully understood, and while I have here shown and described a particular form of the invention, the structural features thereof may be changed as desired, within the scope of the claim.

I claim:

A nasal air filter of the kind described, the same comprising a central stem made up of a pair of fine wires twisted spirally together upon themselves and upon a plurality of soft filaments of uniform length interlaced along between the wires, from end to end of the central stem, and extended radially out therefrom in a cylindrical formation, the said filter being dimensioned to pass up into the nostril of a person, the said wires being looped together at their lower ends to form a handle.

ALEXANDER GILLESPIE.

REFERENCES CITED

The following references are of record in the file of this patent:

UNITED STATES PATENTS

| Number | Name | Date |
|---|---|---|
| 1,297,337 | Feltner | Mar. 18, 1919 |
| 1,441,906 | Beals | Jan. 9, 1923 |
| 1,520,830 | Calhoun | Dec. 30, 1924 |